Dec. 16, 1958  N. E. ROHAN  2,864,196
FISHING GIG
Filed July 16, 1957  2 Sheets-Sheet 1
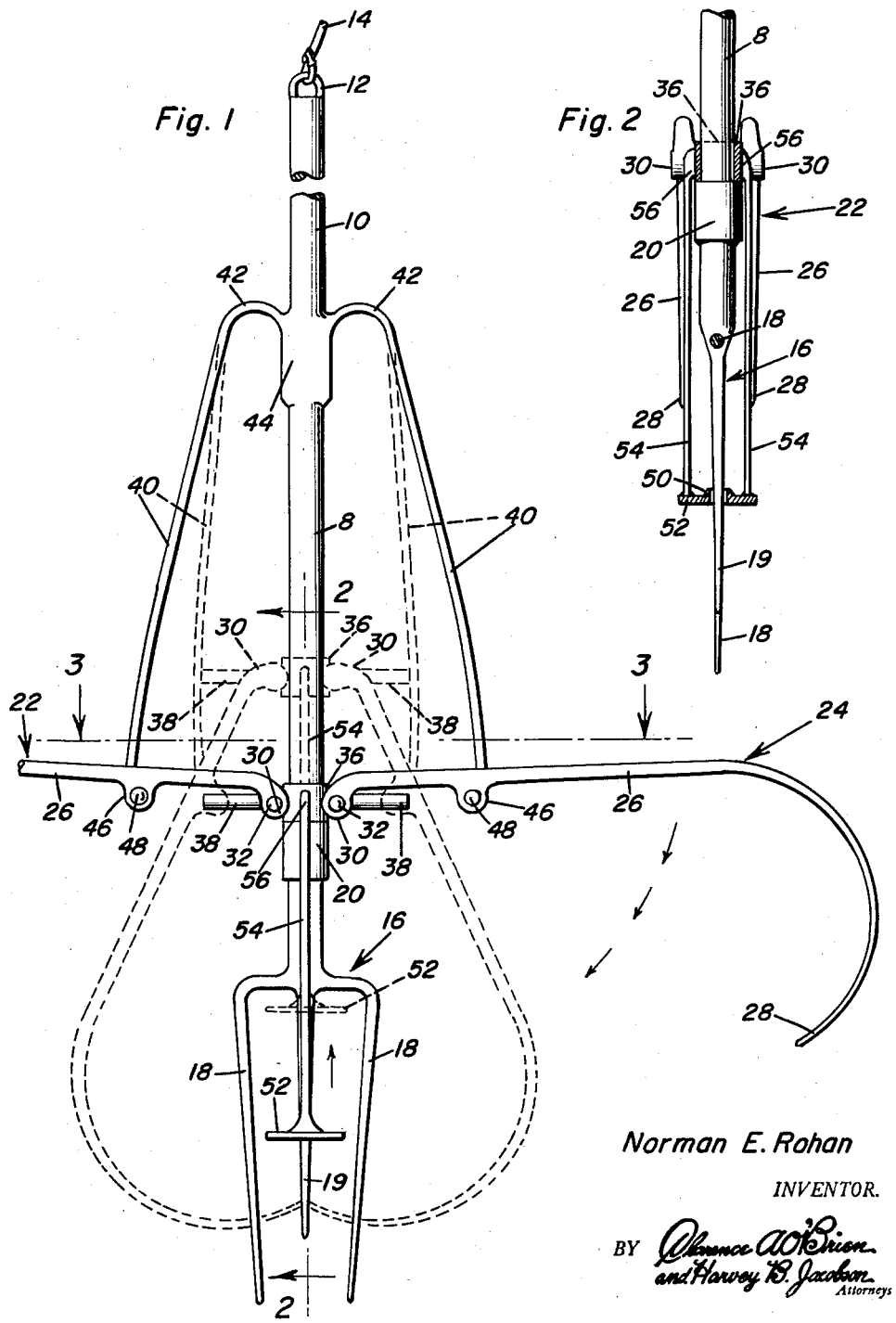
Norman E. Rohan
INVENTOR.

Dec. 16, 1958 — N. E. ROHAN — 2,864,196
FISHING GIG
Filed July 16, 1957 — 2 Sheets-Sheet 2
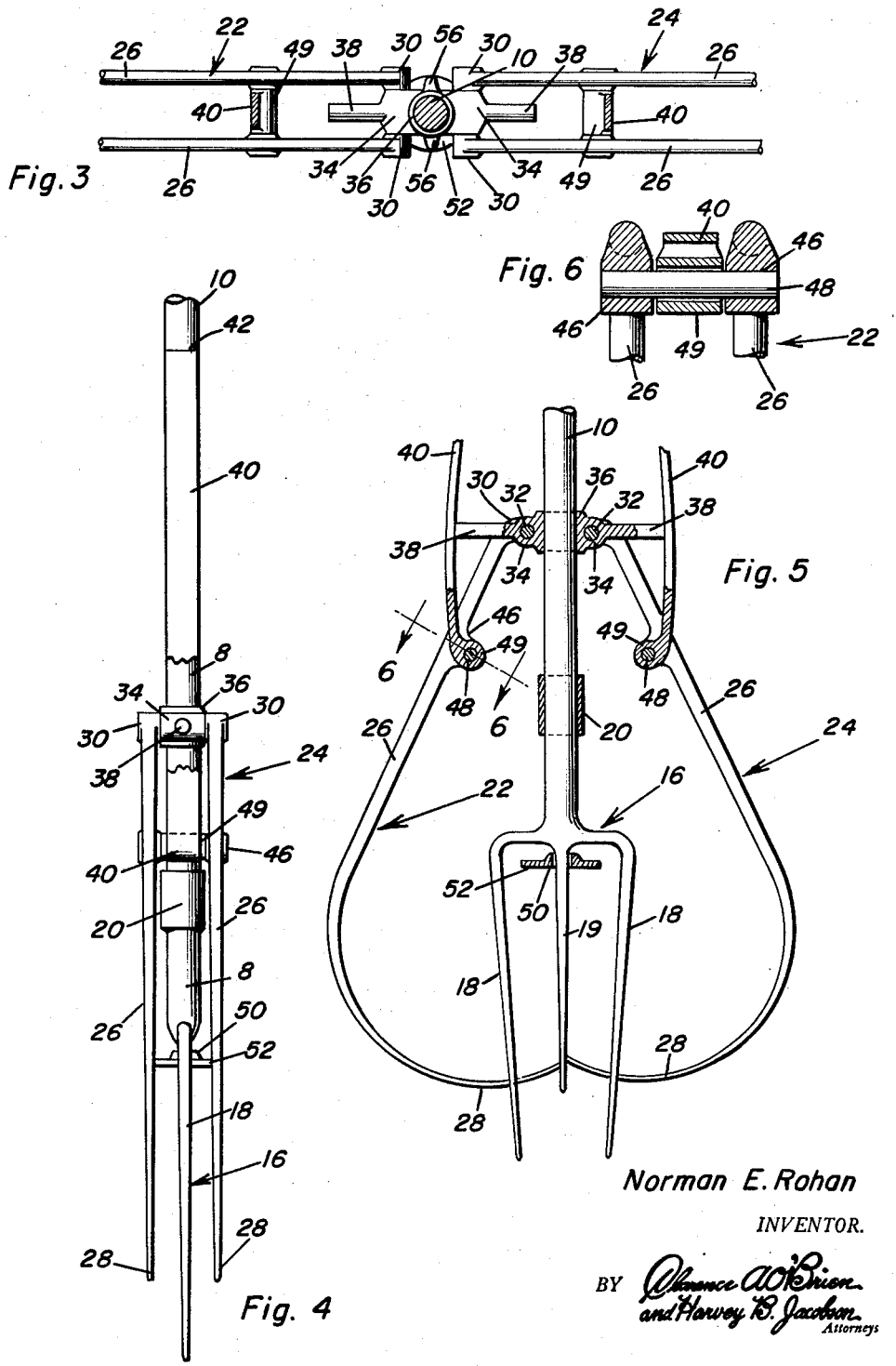
Norman E. Rohan
INVENTOR.

United States Patent Office 2,864,196
Patented Dec. 16, 1958

2,864,196

FISHING GIG

Norman E. Rohan, Victoria, Tex.

Application July 16, 1957, Serial No. 672,173

4 Claims. (Cl. 43—6)

The present invention relates to an improved fishing gig, that is, a fishing device which is characterized by a multiple tine spearing head on the forward end of the rigid rod or staff and which is provided with a pair of jaws hingedly mounted and spring biased, whereby after the fish is speared, the jaws come into play, provide the desired grappling action and insure maintenance of the fish on the spearing head.

The idea that when once the fish has been speared will thereafter be seized and held by grappling jaws is not new and is revealed in the Madison grapple disclosed in Patent No. 1,878,951 of September 20, 1932. The stated patent also shows that hingedly mounting opposed co-planar grappling jaws on diametrically opposite sides of a gaff or prong is old. However, the jaws are simply clipped in open or cocked positions and require fish actuated toggle means to effect the jaw closing operation.

Briefly summarized the improved construction is characterized by an elongated rigid staff having a handle and line attaching eye at its rearward end and a fish spearing head at its forward end embodying a group of cooperating pointed tines, a hub-like collar slidingly mounted on said staff, a trip member slidable on one of said tines and operatively connected with said collar, and spring biased grappling jaws hingedly mounted on and carried by said collar and having hooked penetrating free ends swingable toward and from said spearing head.

More particularly, further novelty is predicated on a sensitive and ready-to-operate jaw construction and arrangement wherein the jaws are positively triggered into action from their set positions, this result being attained through the use of novel reliably responsive spring members.

Structural characteristics, features and advantages inherent with the particular construction herein disclosed will become apparent from the specification read in connection with the drawings:

Figure 1 is an elevational view showing the improved fishing gig with the grappling jaws in spread apart or open position and which shows, in dotted lines, the manner in which they close to assume their grappling positions;

Figure 2 is a view in section and elevation taken on the plane of the vertical line 2—2 of Figure 1, looking in the direction of the arrows;

Figure 3 is a horizontal section on the line 3—3 of Figure 1;

Figure 4 is an end view of the structure seen in Figure 1 with the jaws closed and with portions broken away to uncover details which would not otherwise be seen;

Figure 5 is a view in section and elevation showing the construction and relationship of parts with the jaws closed; and Figure 6 is an enlarged view on the plane of the line 6—6 of Figure 5.

The overall fishing device is characterized by two cooperating components; namely the spearing or harpooning gig on the one hand and, on the other hand, the spring biased jaw-equipped fish grappling and seizing means.

That part of the overall structure called the gig is structurally and functionally similar to a conventional type gig and comprises a rigid elongated linearly straight rod or staff 8 the upper end (in the drawings) having a handle 10 and an eye 12 to accommodate the fishing line 14. On the lower end there is a multiple prong or tine spearing head 16 and this is here characterized by a pair of pitch-fork-like tines 18 and a central shorter tine 19. There is a shoulder or stop provided at 20.

The grapple means is characterized by a pair of diametrically opposite openable and closable grappling jaws, the one on the left denoted by the numeral 22 and the one on the right denoted by the numeral 24. Actually, however, both of these are so-called twin hook jaws, each hook being characterized by a shank 26 and a gradually thinned and sharp pointed bill or beak 28. Since all four of the hooks are structurally the same it is believed that they may be properly referred to by corresponding reference numerals. Continuing with this in mind the upper end of the shank 30 is joined by a pivot or hinge pin 32 to an ear 34 on one side of a sliding collar 36. The collar is freely slidable on the staff and the ears are diametrically opposite to each other and consequently the paired hooks are in the proper opening and closing and grappling relationship. It will be noticed that the ears are provided with outstanding studs 38 functioning as stops for coacting longitudinally bowed spring members 40. These spring members have their upper end portions bent and toed in toward the staff as at 42 (Fig. 1) where they are integrated with the block like portion 44 on the staff. The intermediate portions of the shanks 26 are provided with opposed lugs 46 (Fig. 6) carrying a hinge pin 48 which spans the space between the lugs and provides an arrangement whereby the eyes 49 on the lower ends of the spring members 40 are hingedly and operatively connected with the respective pairs of grappling and seizing hooks.

Attention is now directed to the fish actuated release means. This is a simple construction which serves to automatically trigger the grappling hooks from the set position seen in full lines in Figure 1 to the dotted line position seen in the same figure. More specifically, the means comprises a trip ring 50 having an endless outstanding marginal flange 52 to which the lower ends of the spaced parallel arms 54 are connected. These arms 54 are in spaced parallelism and are located on diametrically opposite sides of the staff and the upper ends 56 are fixed to diametrically opposite sides of the collar as is clear from the drawings. It is also clear that the sliding movement of the collar 36 is fairly limited, the upper position being seen in dotted lines in Figure 1 and the lower position in full lines in which position the collar strikes the fixed stop shoulder 20.

In operation and assuming that the twin-hook grappling jaws 22 and 24 are in the position seen in Figure 5 (which may be said to be in the closed position), it will be obvious that by catching hold of the respective jaws and spreading the same apart to open positions the shank portions stretch out, as it were, in approximate horizontal positions as shown in Figure 1. When the jaws are lifted up to open positions slightly above the dead center positions (seen in Figure 1) the two springs or spring members 40 swing apart and are placed under tension. The arms 54 slide the flanged trip ring (50 and 52) down to the position seen in Figure 2. The overall device is now cocked or set to make a catch. Using the staff either harpoon style or close up style and embedding the tines of the spearing head in the fish it will be seen that when the flange 52 comes into contact with the body of the fish it is moved sufficiently to raise the collar 36 just slightly and when this is accomplished the two springs 40 come into play and result in a quick snap action and spring closing movement of the jaws. The pointed bills of the jaws are driven into the captured fish and as a result of this grappling action the fish is securely grappled and held on the spearing tines 18 and 19 in an obvious manner.

Minor changes in the shape, size, materials and rearrangement of parts which come within the purview of the invention may be resorted to without departing from the scope of the claims.

What is claimed as new is as follows:

1. A fishing device comprising a fishing spear embodying a linearly straight elongated rigid staff having a handle and a line attaching eye at its rearward end and a fish spearing head at its forward end embodying a group of cooperating pointed penetrating tines, a hub-like collar slidingly mounted on said staff above said head, a trip member slidable on one of said tines and operatively connected to and movable with said collar, hook-type grappling jaws having shanks hingedly connected to diametrically opposite sides of said collar, a pair of co-planar diametrically opposite longitudinally bowed leaf springs having their upper ends turned in toward each other and adjoined integrally with a portion of said staff above said collar, the lower ends of said springs being free and terminating in eyes, said eyes being hingedly connected to median portions of the shanks of said grappling jaws and a stop fixedly mounted on said staff at a point below the eyes, whereby the collar associated with said hook-type grappling jaws may be moved down far enough on said staff to cock the device and may also be moved from the cocked position to trip the device by upward pressure applied to said trip member.

2. A fishing device comprising a longitudinally elongated rigid staff having a handle at its upper end and a spearing head at its lower end, said spearing head embodying a pair of outer coplanar pointed tines and an intervening tine coplanar with but shorter than the tines of said pair, a collar slidable on a median portion of said staff above said spearing head, a stop shoulder fixed on said staff below said collar and above said head, said collar being provided with diametrically opposite ears having outstanding co-axial stop prongs, a trip ring slidable on said short tine and having a fish actuated flange, a pair of spaced parallel arms connected at their lower ends with said flange and at their upper ends with diametrically opposite sides of said collar and slidable in conjunction with the collar, diametrically opposite grappling jaws having inner ends hingedly mounted on the ears on said collar, a pair of co-planar diametrically opposite longitudinally bowed leaf springs in alignment with said jaws and stop prongs and having upper ends inturned and joined to diametrically opposite sides of said staff in a position above said collar and having lower ends hingedly connected with median portions of said jaws, said stop shoulder being fixed to said staff at a point below the hinged lower ends of said leaf springs, whereby the collar associated with said jaws may be moved down far enough on said staff to cock the device and may also be moved from the cocked position to trip the device by upward pressure applied to said trip ring.

3. The structure defined in claim 6 and wherein each jaw comprises a pair of duplicated spaced parallel J-shaped hooks rigidly connected and adapted to operate as an entity.

4. A fishing device comprising an elongated rigid staff having handling and line connecting means at an upper end portion and a rigid spearing head at a lower end, said head embodying a plurality of pointed tines one of which is in axial alignment with and projects beyond the adjacent lower end of the staff, a stop shoulder embracing said staff in a position above the head at a predetermined place, a pair of elongated leaf springs having upper ends directed toward and rigidly joined with a median portion of the staff and having free lower end portions terminating in a position above said stop shoulder, diametrically opposite grappling jaws having median portions hingedly connected with the cooperating ends of said leaf springs, a collar having restricted sliding movement and embracing said rod and adapted to abut said stop shoulder, adjacent inner ends of the shank portions of said grappling jaws being hingedly connected with diametrically opposite sides of said collar, a trip ring slidingly mounted on the tine which is aligned with the rod, and means rigidly connecting said trip ring with said collar.

References Cited in the file of this patent

UNITED STATES PATENTS

| 515,875 | Dreese | Mar. 6, 1894 |
| 1,878,951 | Madison | Sept. 20, 1932 |

FOREIGN PATENTS

| 147,600 | Australia | July 30, 1952 |